United States Patent

[11] 3,605,037

| | | |
|---|---|---|
| [72] | Inventor | Lucian A. D'Asaro<br>Madison, N.J. |
| [21] | Appl. No. | 821,282 |
| [22] | Filed | May 2, 1969 |
| [45] | Patented | Sept. 14, 1971 |
| [73] | Assignee | Bell Telephone Laboratories, Inc.<br>Murray Hill, N.J. |

[54] CURVED JUNCTION LASER DEVICES
7 Claims, 3 Drawing Figs.

[52] U.S. Cl. .................................................. 331/94.5,
317/234, 356/106
[51] Int. Cl. ........................................................ H01s 3/18
[50] Field of Search .......................................... 331/94.5;
317/235/27; 307/312; 313/108 D; 200/217 SSL;
350/160; 356/106 RL

[56] References Cited
UNITED STATES PATENTS

| 3,245,002 | 4/1966 | Hall | 331/94.5 |
|---|---|---|---|
| 3,248,671 | 4/1966 | Dill et al. | 331/94.5 |
| 3,295,911 | 1/1967 | Ashkin et al. | 350/150 |
| 3,359,507 | 12/1967 | Hall | 331/94.5 |
| 3,359,509 | 12/1967 | Hall | 331/94.5 |
| 3,402,366 | 9/1968 | Williams et al. | 331/94.5 |
| 3,454,843 | 7/1968 | Fulop et al. | 317/235 |

OTHER REFERENCES

Leite et al.: " On Mode Confinement in p-n Junctions," vol. 51, pp. 1035–1036, July, 1963

*Primary Examiner*—Ronald L. Wibert
*Assistant Examiner*—Edward S. Bauer
*Attorneys*—R. J. Guenther and Arthur J. Torsiglieri ABSTRACT: The specification describes an injection-type laser device in which the junction is formed in a curved configuration to form a ring or semiring shaped cavity. The radius of curvature of the ring must exceed a critical minimum for sustained laser oscillations.

PATENTED SEP 14 1971 3,605,037

INVENTOR
L. A. D'ASARO
BY
ATTORNEY

CURVED JUNCTION LASER DEVICES

This invention relates to a semiring- or ring-shaped injection laser device.

Injection lasers have received considerable attention since the successful demonstration in 1962 of stimulated emission between energy bands of direct gap materials. Most frequently the laser diode has been made in the form of a tiny solid rectangular block with typical dimensions in the order of tenths of a millimeter. The junction is typically diffused through a flat polished surface which gives rise to a flat planar junction. The junction region lies between the lossy n- and p-layers. Two opposite side faces are cleaved or polished to form a Fabry-Perot cavity. The high index of refraction (e.g. 3.6 for GaAs) of commonly used diode materials eliminates the need for reflective coatings to provide partial reflections. The partial reflections provide a positive feedback mechanism which is necessary to sustain laser oscillations.

Ohmic contacts are made to the top and bottom surfaces of the device and current is applied in the forward direction. Spontaneous emissions will cause a plane wave of the proper type and frequency to begin propagating along the axis between the parallel reflectors, and if sufficient stimulated emission (or gain) is available to overcome all the losses, oscillations will build rapidly. Coherent light from the partially reflecting end faces radiates from a narrow stripe (typically about 20 microns wide) located in the vicinity of the junction. Frequencies of oscillation are determined primarily by the reflector spacing, the dispersive nature of the media, and the spontaneous emission bandwidth. It is evident that the light in this device propagates in a straight line.

It has now been found that a stimulated mode in a junction laser can be made to propagate in a curved path, in fact an unexpectedly sever curved path, without introducing sufficient losses to destroy the Q of the oscillating or stimulated mode. The curved mode propagation is effected by forming the junction in a curved geometry.

The useful implications of the curved mode laser are attributable to two distinct characteristics of the device. One of these is basic: the curved nature of the propagating mode itself. By imparting angular motion to this mode, angular velocity and acceleration can be measured. The other characteristic of this device is derived from the curved nature of the propagating mode in that if the curvature is made to approximate 180°, so as to give a semiring laser, two parallel or essentially parallel beams can be obtained from a single-laser device. Since these beams are actually a single beam, the outputs are matched in frequency and phase. The useful implications of two essentially parallel, phase-matched beams are known to those skilled in the art. Exemplary applications are in holography and optical heterodyning.

These and other aspects of the invention may become more evident from the following detailed description. In the drawing.

Figure 1:
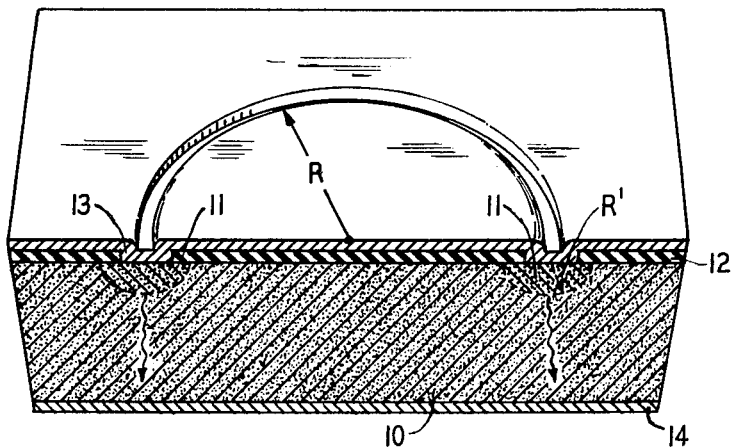
FIG. 1 is a perspective view of a semiring laser that is the basic element of the invention.

The device shown in FIG. 1 is a semiring laser comprising an n-type gallium arsenide substrate 10 having a semiring-shaped p-region 11 formed into one major surface so as to form a p–n junction in the shape of an incomplete toroid of a semicircle, i.e., a semicircle rotated 180° about an axis in its plane. This surface is covered with an insulating layer 12 with an etched region over the p-region so that contact to the p-region can be made by the application of metal contact layer 13. The opposite face of the substrate 10 is covered with a contact layer 14. When the junction is properly biased light is emitted from both exposed regions of the junction as shown schematically in the figure.

Figure 2:
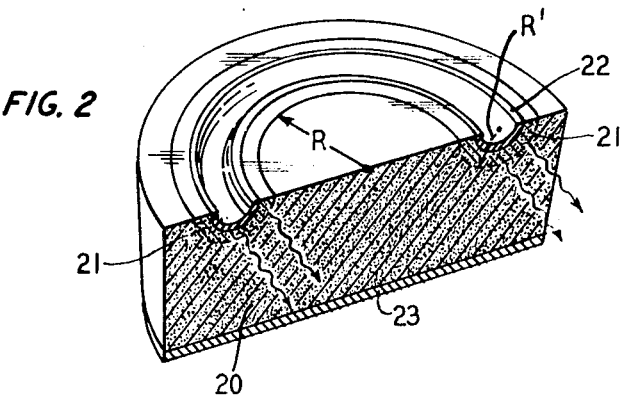
FIG. 2 is a perspective view of a preferred embodiment of a semiring laser.

FIG. 2 is an alternative embodiment of a semiring laser in which the geometry is again such as to discourage noncircumferential light propagation. The n-region 20 is physically grooved and a p-type impurity diffused or otherwise formed into the surface of the groove to from a semiring-shaped p-region 21. Metal contacts 22 and 23 are provided to the p-region and n-region, respectively. This diode configuration is somewhat more difficult to reproduce accurately due to the irregularities in machining or etching the groove. This structure demonstrates an alternate embodiment of the same ideas.

Figure 3:
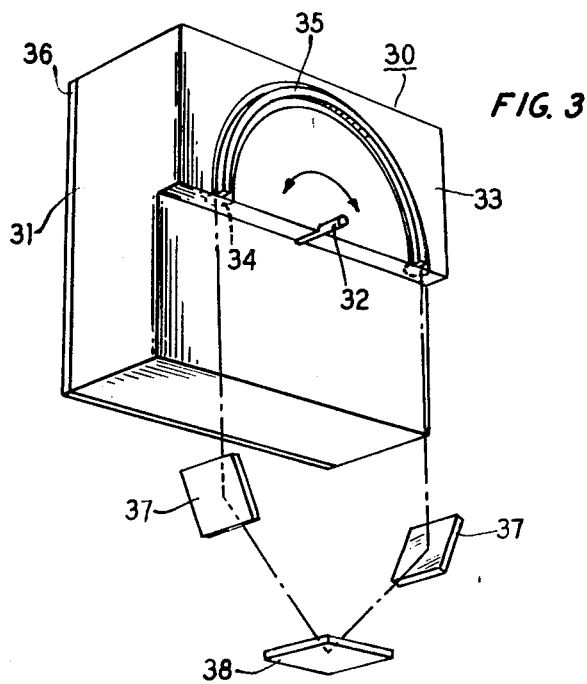
FIG. 3 is a perspective view of a rotation rate-sensing device which incorporates a ring laser in accordance with a preferred embodiment of the invention.

The partly schematic representation of FIG. 3 describes a semiring laser used in a rotational rate-sensing apparatus. The diode assembly 30 is shown in perspective and comprises a substrate block 31 mounted for rotation about axis 32. The block has a raised portion 33 in which the semiring junction 34 is formed. Contacts 35 and 36 provide means for forward biasing the junction. The light output from the semiring junction is shown schematically and is directed by reflectors 37 onto a recording medium 38 which may be a photocathode.

When the diode assembly is rotated the differential path lengths between the clockwise and counterclockwise beams produce an interference fringe pattern on the recording medium 36. The difference in path lengths is proportional to the angular velocity or rotation rate and the radius of the diode ring. A large diode ring would appear to be desirable. However, since the coherent property of the light and the optical heterodyning capability combine to produce sensitivities to frequency shifts of one part in $10^{12}$, a small diode laser in this apparatus provides a highly sensitive instrument. For some applications (e.g. in gyroscopes for space vehicles) the small size may be distinctly advantageous. (For a more complete treatment of rotation rate sensing with lasers, see *Journal of Applied Physics*, Vol. 2, No. 3, pages 67–68 (1963), and *Journal of the Optical Society of America*, Vol. 52, page 1143 (1962)).

A typical fabrication procedure for the device of FIG. 1 is given in the following exemplary embodiment.

A gallium arsenide wafer 20 mils thick and 100 mils in diameter having an n-type resistivity of $0.003\Omega$ cm. was polished and coated on one major face with 1,000A. of $SiO_2$ and 7,000A. of $SiO_2$+P. The coating techniques were conventional. A KPR photoresist was applied and the $SiO_2$ layers were etched to give the ring-shaped opening evident in layer 12 of FIG. 1. The wafer was diffused at 850° C. for several hours to form the p-region 11 of FIG. 1. The diffusion was carried out in a quartz ampul containing Zn, Ga and GaAs. The concentration of Zn was 1 percent of the Ga weight, with sufficient GaAs added to saturate the Ga with GaAs at 850° C. This diffusion produced a layer $\sim 2\mu m$. deep and an average hole concentration of $2\times10^{18}cm.^{13}$. The wafer was then removed to a second ampul and diffused with zinc from a Zn $As_2$ source for 10 minutes at 650° C. This last diffusion creates a p+surface layer for ensuring good ohmic contact.

Contacting the n- and p-regions was a five step process beginning with cleaning the samples in concentrated sulfuric acid. Next, a gold flash plating was applied using a solution of $AuCl_2$ in HF. The flash coating was covered with nickel by electroless deposition using a hot (100° C.) solution containing nickelous chloride. These coatings were then sintered by heating at 450° C. in forming gas. The sintered contact was then overplated with nickel to give a solderable surface. The coating operations used for forming the contact are conventional and form no part of the invention.

The wafer was then lapped to form the semiring configuration and the end face where the junction was exposed was polished by conventional methods. The diode was then mounted on a standard header with a wire contact to the p-region.

The device shown in FIG. 2 can be made using a similar procedure. It is convenient to apply the $SiO_2$ coating, and then form the groove mechanically or by masking and etching. Etching will not normally produce a groove shaped like that appearing in the drawing but the shape of the junction in cross section is not considered to be important. The cross section can be V-shaped, U-shaped, semicircular, etc.—whatever can be conveniently produced.

Several diodes produced by the above techniques were tested for threshold current and spectral characteristics. The effect of the diode geometry was also thoroughly investigated. Current voltage characteristics and spectral output was found comparable to standard injection lasers. In the investigation of the junction geometry it was discovered that the radius of curvature of the junction must be of the order of at least 0.4 mm. The critical radius is determined by the difference in refractive index between the depletion region of the junction and the bulk semiconductor.

In view of the critical radius, the effectiveness of the devices of FIGS. 1 and 2 will be appreciated. If, for example, the critical radius for this diode is 0.4 mm., and the radius R exceeds 0.4 mm. while the radius R' does not, circular mode propagation will be supported in the major plane of the diode but not in the curvature defined by radius R'. (In the device of FIG. 1 the radius of the diffused $p$-region normally would not approach the critical limit.)

Whereas the foregoing description has dealt largely with gallium arsenide injection lasers, it will be evident to those skilled in the art that the principles of physics and optics which are embodied in the invention will be applicable to a large variety of junction type lasers (e.g. gallium arsenide heterojunction lasers as described in application of I. Hayashi, Ser. No. 787,459, filed Dec. 27, 1968). The discovery that the junction will serve as an efficient optical waveguide for sharp curvatures (but less than a critical curvature) is the fundamental teaching advanced. Junctions with curvatures of 30° to 180° were successfully demonstrated and it is clear that full-ring lasers will be effective also. With a full-ring, a notch or imperfection can be provided to couple light out of the cavity. Since it would not be unexpected that a curved junction showing a small degree of curvature would support an oscillating mode, it is useful to prescribe a maximum radius of curvature which would define only those geometries evidencing the unexpected waveguide properties taught herein. For this purpose the junction should have a radius of curvature between 0.4 mm. and 40 mm. The width of the junction is largely immaterial since the dominant modes will travel the periphery of the junction. Except in the case of the full-ring laser, which can emit tangentially in any (or all) directions, the dual beams emerging from the partial-ring laser of this invention should be within 30° of each other for most applications. This requires a partial ring of 150° to 210° with the semiring case where the angle is 180° being preferred for certain applications.

What is claimed is:

1. An injection-type laser in which the dominant oscillating mode propagates in a curved path such that two coherent output beams are produced emerging from the laser within an angle of 30° of one another, the laser comprising a semiconductor body having a first region of one conductivity type and a second region of the opposite conductivity type formed into one surface of said first region to form a diode, the second region having the approximate shape of an incomplete toroid of a semicircle with both ends terminating at an edge bounding said first region so that the cross section of the second region is exposed at the edge or edges bounding the first region, the radius of the aforesaid toroid rotated through an angle in the range of 150° to 210° and having a length in the range of 0.4 mm. to 40 mm. and means for forward biasing the diode so as to produce two coherent light beams radiating within 30° of the same direction.

2. The laser of claim 1 wherein the angle of rotation is 180° so that the two coherent light beams are parallel.

3. The laser of claim 1 wherein the diode comprises gallium arsenide.

4. The laser of claim 1 wherein the radius of curvature of the cross section is less than 0.4 mm.

5. The laser of claim 1 wherein the first region includes a planar surface of the semiconductor body and the second region is formed into the planar surface.

6. The laser of claim 1 wherein the second region is formed into a depression on the surface of the semiconductor body.

7. An injection-type laser in which the dominant oscillating mode propagates in a curved path such that two coherent output beams are produced emerging from the laser within an angle of 30° of one another, the laser comprising a semiconductor body having a first planar region of one conductivity type and a second region of the opposite conductivity type formed into one surface of said first region to form a diode, the second region having the approximate shape of a complete toroid of a semicircle, the radius of the aforesaid toroid having a length in the range of 0.4 mm. to 40 mm., and means for forward biasing the diode so as to produce a coherent light output radiating tangentially from the toroid.